United States Patent
Kim et al.

(10) Patent No.: US 8,717,382 B2
(45) Date of Patent: May 6, 2014

(54) METHOD OF DETECTING COLLISIONS IN GRAPHICS PROCESSING UNIT

(75) Inventors: Young Jun Kim, Seoul (KR); Fuchang Liu, Seoul (KR)

(73) Assignee: Ewha University-Industry Collaboration Foundation, Seoul (KR)

( * ) Notice: Subject to any disclaimer, the term of this patent is extended or adjusted under 35 U.S.C. 154(b) by 398 days.

(21) Appl. No.: 13/175,173

(22) Filed: Jul. 1, 2011

(65) Prior Publication Data

US 2012/0176402 A1    Jul. 12, 2012

(30) Foreign Application Priority Data

Jan. 6, 2011    (KR) ........................ 10-2011-0001209

(51) Int. Cl.
*G09G 5/00*    (2006.01)

(52) U.S. Cl.
USPC ............................................ 345/619

(58) Field of Classification Search
USPC ........ 703/2; 707/999.002; 345/958; 718/105; 463/32
See application file for complete search history.

(56) References Cited

U.S. PATENT DOCUMENTS

| | | | | |
|---|---|---|---|---|
| 7,127,381 | B2 * | 10/2006 | Forest et al. | 703/2 |
| 7,689,541 | B1 * | 3/2010 | Le Grand | 707/999.002 |
| 8,437,992 | B2 * | 5/2013 | Bond et al. | 703/6 |
| 2003/0117405 | A1 * | 6/2003 | Hubrecht et al. | 345/543 |
| 2003/0164864 | A1 * | 9/2003 | Aharon et al. | 345/958 |
| 2004/0095352 | A1 * | 5/2004 | Huang | 345/473 |
| 2010/0235608 | A1 * | 9/2010 | Armoni et al. | 712/17 |
| 2011/0306417 | A1 * | 12/2011 | Sheblak et al. | 463/32 |
| 2011/0321057 | A1 * | 12/2011 | Mejdrich et al. | 718/105 |

* cited by examiner

*Primary Examiner* — Phi Hoang
(74) *Attorney, Agent, or Firm* — Lexyoume IP Meister, PLLC (57) ABSTRACT

The present invention relates to a method of detecting collisions on a Graphics Processing Unit (GPU). Each collision detection object $O_i$ is projected onto a reference direction, thus obtaining an interval $I_i$ represented by a set $\{m_i, M_i\}$. Radix sorting based on obtained $m_i$ for all $O_i$, thus obtaining a sorted list L. The sorted list is swept, and then colliding pairs $P_i$ are detected. All colliding pairs are configured into a single set, thus obtaining a final colliding pair P. On a GPU, SaP can be performed on a plurality of collision detection objects in parallel using the blocks of a plurality of threads.

16 Claims, 11 Drawing Sheets

| THREAD ALLOCATION | APPLIED | NON-APPLIED |
|---|---|---|
| 64K | 13.71 | 30.05 |
| 128K | 48.16 | 124.11 |
| 256K | 241.51 | 467.78 |

# METHOD OF DETECTING COLLISIONS IN GRAPHICS PROCESSING UNIT

CROSS-REFERENCE TO RELATED APPLICATION

This application claims priority to and the benefit of Korean Patent Application No. 10-2011-0001209 filed in the Korean Intellectual Property Office on Jan. 6, 2011, the entire contents of which are incorporated herein by reference.

BACKGROUND OF THE INVENTION

1. Field of the Invention

The present invention relates to collision detection. In particular, the present invention relates to collision detection that can be performed in a Graphics Processing Unit (GPU) and, more particularly, to a method of detecting collisions in parallel for a plurality of collision detection objects.

2. Description of the Related Art

Collision detection is the problem of determining overlapping or interference occurring between collision detection objects that are moving in a space. Collision detection becomes an issue in various fields such as computer graphics, computer animation, virtual reality, geometric modeling, haptics, and robotic engineering.

Collision detection technology is mainly classified into broad-phase algorithms and narrow-phase algorithms. Broad-phase algorithms are intended to determine possible intersecting pairs from n collision detection objects, and narrow-phase algorithms are intended to determine one pair from collision detection objects determined by the broad-phase algorithms. The present invention relates to such a broad-phase algorithm, which is also referred to as 'n-body collision culling'.

There is required the flow simulation of collision detection objects conducted on several millions of particles in particle-based simulation areas, such as Distinct-element Method (DEM), Smoothed Particle Hydrodynamics (SPH), and Moving-Particle Semi-implicit (MPS). Further, in Massively Multi-Player Online Role-Playing Game (MMORPG), as a minimum of several thousands of users log in to the same server and perform activity therein, they interact with several tens of thousands of characters and surrounding collision detection objects. In many application fields including these examples, there is required collision detection technology for obtaining higher processing speed while conducting detection on a very large number of collision detection object sets.

The best-known broad-phase collision detection algorithm includes a Sweep and Prune (SaP) technique and a spatial subdivision technique. SaP is an access method configured to reduce a dimensional space by performing an overlap test that sweeps a hyperplane along a dimensional spatial axis when collision detection objects are projected into a low-dimensional space (generally, one-dimensional space). Spatial subdivision is a spatial hashing technique for performing a local intersection test in any type of grid for collision detection objects registered in the grid.

SaP is effective when moving collision detection objects have high spatial coherence at the time of performing a sweep operation, but is problematic in that efficiency is worse in the opposite case. Spatial subdivision is effective in the case of collision detection objects of the same size, but is problematic in that efficiency is worse in the case of a structure having a complicated system.

Therefore, it can be concluded that what is required is a fast collision detection algorithm that is applicable without being limited by the size of or the movement tendency of collision detection objects.

SUMMARY OF THE INVENTION

A method of detecting collisions in a GPU according to the present invention has the following objects to be solved.

First, the present invention is intended to improve the effect and speed of collision detection by combining the advantages of a SaP algorithm and a spatial subdivision technique.

Second, the present invention is intended to improve the effect and speed of collision detection by performing a parallel SaP algorithm in the GPU.

Third, the present invention is intended to provide an algorithm capable of easily adding or removing collision detection objects in collision detection.

The objects of the present invention are not limited to the above description, and other objects not described here will be clearly understood by those skilled in the art from the following description.

In accordance with an aspect of the above objects, the present invention provides a method of detecting collisions in a Graphics Processing Unit (GPU), including a) projecting each collision detection object $O_i$ onto a reference direction, thus obtaining an interval $I_i$ represented by a set $\{m_i, M_i\}$.

The method of detecting collisions in the GPU according to the present invention includes b) performing radix sorting based on $m_i$ obtained at a) for all $O_i$, thus obtaining a sorted list L.

The method of detecting collisions in the GPU according to the present invention includes c) sweeping the list sorted at b), and then detecting colliding pairs $P_L$.

The method of detecting collisions in the GPU according to the present invention includes d) configuring all colliding pairs detected at c) into a single set, thus obtaining a final colliding pair P.

In this case, an i-th collision detection object of n collision detection objects may be denoted by $O_i$, and $m_i$ and $M_i$ may denote locations of extremal points in the reference direction.

Preferably, c) may include c-1) sweeping the sorted list L during the interval $I_i$ until $M_i < m_j$ is satisfied for a collision detection object $O_j$ satisfying i<j; and c-2) adding a pair $\{O_i, O_j\}$ to $P_i$ when $O_i \cap O_j \neq 0$ is satisfied for $O_j$ satisfying $m_j \in I_i$.

Preferably, the method of detecting collisions in the GPU according to the present invention may be characterized in that one GPU thread may be allocated to each $O_i$ so that collision detection is performed.

Preferably, the method of detecting collisions in the GPU according to the present invention may be configured such that each $O_i$ is divided into partitions, each having an identical number of collision detections, and a single GPU thread is allocated to each partition, thus performing collision detection.

Preferably, binary search is performed on the sorted list L to determine a number of partitions, which is represented by $$\left\lceil \frac{p-i}{\tau} \right\rceil.$$

In this case, p−i may denote a number of potential colliding pairs, and τ may denote a maximum number of colliding pairs to which a single thread can be allocated.

Preferably, the sweep direction at c) may be determined using Principal Component Analysis (PCA).

The sweep direction of the present invention may be determined by a vector value $w_1$ given in the following equation, the vector value $w_1$ being identical to a direction of a first principal component of PCA, $$w_1 = \underset{\|w\|=1}{\operatorname{argmax}} \operatorname{Var}\{w^T X\}$$
$$= \underset{\|w\|=1}{\operatorname{argmax}} E\{w^T X X^T w\}$$

where $w_1$ denotes an eigenvector corresponding to a largest eigenvalue of a covariance matrix $C=XX^T$.

Preferably, the method of detecting collisions in the GPU according to the present invention may further include a0) dividing a workspace, before a).

Preferably, a0) may include a0-1) when the sweep direction is assumed to be 'd' at c) subdividing the workspace into m×m grid cells cut by a plane parallel to 'd', and a0-2) when there is a collision detection object passing through boundaries of cells subdivided at a0-1), shifting the interval $I_i$ using (j−1)×l which is the direction 'd', In this case, $$m = \lceil \frac{n}{64K} \rceil,$$

n is a number of collision detection objects, j is an index of a cell $C_\varphi$, to which $O_l$ belongs, and l is a size of the workspace along the direction 'd'.

The method of detecting collisions in the GPU according to the present invention may further include, before c), performing cell subdivision to remove collision detection objects which do not actually intersect, but have overlapping projection intervals.

Preferably, the performing cell subdivision may be configured to divide a single cell into a reference number of subcells and to eliminate a relevant collision detection object from collision detection objects when the relevant collision detection object is not a collision detection object that shares an identical subcell.

In accordance with another aspect of the present invention, there is provided a method of detecting collisions in a Graphics Processing Unit (GPU), including a) projecting each collision detection object $O_i$ onto a reference direction, thus obtaining an interval $I_i$ represented by a set $\{m_i, M_i\}$.

Preferably, the method of detecting collisions in the GPU according to the present invention may include b) performing radix sorting based on $m_i$ obtained at a) for all $O_i$, thus obtaining a sorted list L.

Preferably, the method of detecting collisions in the GPU according to the present invention may include c) sweeping, in parallel, moving collision detection objects in the list sorted at b), and then detecting colliding pairs $P_M(t)$.

Preferably, the method of detecting collisions in the GPU according to the present invention may include d) detecting interfering pairs $P_o(t)$ from a set $O_o(t)$ of static collision detection objects.

Preferably, the method of detecting collisions in the GPU according to the present invention may include e) calculating a union of $P_M(t)$ detected at c) and $P_o(t)$ detected at d), thus obtaining a final colliding pair P.

Preferably, an i-th collision detection object of n collision detection objects may be denoted by $O_i$, and $m_i$ and $M_i$ may denote locations of extremal points in the reference direction.

Preferably, c) may include c-1) for all $O_l$, belonging to $O_o(t)$, detecting a set $P_{o\mu}(t)$ of colliding pairs between the set $O_o(t)$ of the static collision detection objects and a set $O_\mu(t)$ of moving collision detection objects by using parallel sweeping; c-2) for all $O_l$ belonging to $O_\mu(t)$, detecting a set $P_{\mu*}(t)$ of colliding pairs by comparing the set $O_\mu(t)$ of the moving collision detection objects with sets O of all other collision detection objects by using parallel sweeping; and c-3) calculating a union of the $P_{o\mu}(t)$ and the $P_{\mu*}(t)$.

Preferably, d) may be configured to detect the interfering pairs $P_o(t)$ from the set $O_o(t)$ of the static collision detection objects after a colliding pair P(t−1) corresponding to previous time, wherein $P_o(t)$ is detected by calculating a difference set between P(t−1) and $P'_M(t-1)$ represented by the following equation:

$$P'_M(t-1) \equiv \{\forall(O_i,O_j) \in P(t-1) | O_i \in O_\mu(t) \lor O_j \in O_\mu(t)\}$$

Preferably, the method of detecting collisions in the GPU according to the present invention may be characterized in that one GPU thread may be allocated to each $O_i$ so that collision detection is performed.

Preferably, the method of detecting collisions in the GPU according to the present invention may be configured such that each $O_i$ is divided into partitions, each having an identical number of collision detections, and a single GPU thread is allocated to each partition, thus performing collision detection.

Preferably, binary search is performed on the sorted list L to determine a number of partitions, which is represented by $$\lceil \frac{p-i}{\tau} \rceil.$$

In this case, p−i may denote a number of potential colliding pairs, and τ may denote a maximum number of colliding pairs to which a single thread can be allocated.

Preferably, the method of detecting collisions in the GPU according to the present invention may further include a0) dividing a workspace, before a).

Preferably, a0) may include a0-1) when the sweep direction is assumed to be 'd' at c) subdividing the workspace into m×m grid cells cut by a plane parallel to 'd', and a0-2) when there is a object passing through boundaries of cells subdivided at a0-1), shifting the interval $I_i$ using (j−1)×l which is the direction 'd'.

In this case, $$m = \lceil \frac{n}{64K} \rceil,$$

n is a number of collision detection objects, j is an index of a cell $C_\varphi$ to which $O_l$ belongs, and l is a size of the workspace along the direction 'd'.

Preferably, the sweep direction at c) may be determined using Principal Component Analysis (PCA).

Preferably, the sweep direction may be determined by a vector value $w_1$ given in the following equation, the vector value $w_1$ being identical to a direction of a first principal component of PCA, $$w_1 = \underset{\|w\|=1}{\mathrm{argmax}} \mathrm{Var}\{w^T X\}$$
$$= \underset{\|w\|=1}{\mathrm{argmax}} E\{w^T X X^T w\}$$

In this case, $w_1$ may denote an eigenvector corresponding to a largest eigenvalue of a covariance matrix $C=XX^T$.

Preferably, the method of detecting collisions in the GPU according to the present invention may further include, before c), performing cell subdivision to remove collision detection objects which do not actually intersect, but have overlapping projection intervals.

Preferably, the performing cell subdivision may be configured to divide a single cell into a reference number of subcells and to eliminate unnecessary collision detection when two objects do not share an identical subcell.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

In the terms used in the specification, the representation of a singular form should be understood to include the representation of a plural form unless context dictates otherwise. A term such as "include" is intended to mean that described features, numbers, steps, operations, components, parts or combinations thereof are present, and should not be construed as excluding the probability of the presence or addition of one or more other features, numbers, steps, operations, components, parts or combinations thereof.

Typical SaP Algorithm

A Sweep and Prune (SaP) technique is a sorting-based algorithm and is effective in the case of high spatial coherence. The complexity of the SaP algorithm is known as O(n+s), where n is the number of collision detection objects having specific shapes and s is the number of swapping operations for maintaining the sorting sequence of the collision detection objects.

In a three-dimensional (3D) environment, when an i-th one of n collision detection objects is assumed to be $O_i$, the target of SaP is to search for pairs of all collision detection objects, which overlap each other in the space, among the collision detection objects. Therefore, it is assumed that $P=\{(O_i, O_j)|O_i \cap O_j \neq 0, 1 \leq i \neq j \leq n\}$ is satisfied and each collision detection object $O_t$ has a simple shape such as the shape of an Axis-Aligned Bounding Box (AABB) or a sphere, and it is then assumed that the determination of whether $O_i \cap O_j \neq 0$ is performed within a constant time.

A conventional SaP algorithm is intended to determine whether the intervals at which collision detection objects such as AABB are projected into a 3D space overlap each other. The conventional typical SaP algorithm (Baraff 992) can be described using the following steps.

Conventional first step: The extent of each collision detection object $O_t$ is projected onto a reference axis. For example, a 1D interval of extremal points relative to an x axis is generated. The interval is represented by $I_i=\{m_i, M_i\}$, where $m_i$ and $M_i$ denote the locations of the extremal points in a reference direction (here, an x axis direction).

Conventional second step: $m_i$ and $M_i$ for all i are sorted and a sorted list L is obtained.

Conventional third step: L is swept and an active list A is maintained. (a) When $m_i$ is searched for in L, $O_i$ is added to A and all $O_j$ present in A are added to the set $P_x$ of colliding pairs. (b) When $M_i$ is searched for in L, A is deleted from $O_i$.

Conventional fourth step: The first to third steps are repeated even on y and z axes, so that colliding pairs $P_y$ and $P_z$ are obtained. The final colliding pair $P=P_x \cap P_y \cap P_z$ is detected.

In the case where the motions of the collision detection objects are highly coherent, if the second step algorithm is performed using insertion sorting, it is effective (Cohen 1995), and the third step can be replaced by a swapping operation between neighboring $O_i$. When the collision detection objects have spherical shapes, it can be determined whether they overlap each other if the distances from the centers of the spheres are compared to each other, and thus the conventional fourth step is not required. Furthermore, the interval $I_i$ corresponds to the diameter of the sphere positioned on the projected center.

The above-described conventional SaP algorithm is not suitable for a large number of collision detection objects having random motions, and is not suitable for the parallel performance of the entire algorithm even if the conventional first step can be performed by a Graphics Processing Unit (GPU) using radix sorting.

The reasons for such unsuitableness are summarized as follows: First, since collision detection is determined according to a sweeping sequence, it is impossible to process the maintenance of the active list A in parallel. Second, the above-described conventional third and fourth steps are not suitable for the reduction of memory access costs in the current GPU structure. Third, when the collision detection objects are very big, the number of estimations and related swapping operations for highly coherent motions increase in a geometrical progression.

Hereinafter, a method of detecting collisions in the GPU will be described in detail with reference to the attached drawings.

Parallel SaP Algorithm

The present invention is intended to execute a SaP algorithm in parallel on a GPU. Such a GPU is a processor implemented as a single chip, which has been originally used for three-dimensional (3D) applications and produces a 3D scene that is newly drawn each time, such as in light source effects and object deformation. These are tasks that use intensive mathematical computations and that may exert a lot of burden on a Central Processing Unit (CPU) unless the GPU is present. Such a GPU may release the CPU from this burden, and allow the cycles of the CPU to be used for other tasks.

Compared to the above-described conventional SaP algorithm, the principal characteristics of the present invention are summarized as follows. Unlike the conventional SaP algorithm, the parallel SaP algorithm of the present invention does not require an active list, and performs a procedure for calculating a sorted list L corresponding to the conventional second step of the above-described typical SaP algorithm by sorting $O_i$ based only on $m_i$. Further, when sweeping L, whether $m_j \in I_i$ is satisfied is determined only for collision detection objects $O_j$ satisfying i<j. The reason for this is that $(O_j, O_i)$ can be derived from $(O_i, O_j)$. The procedure corresponding to the conventional second step is performed by GPU-based radix sorting, and then does not require a swapping operation. The sweeping step corresponding to the conventional third step is performed by independently sweeping respective $O_i$ collision detection objects within their intervals $L_i$.

Figure 1:
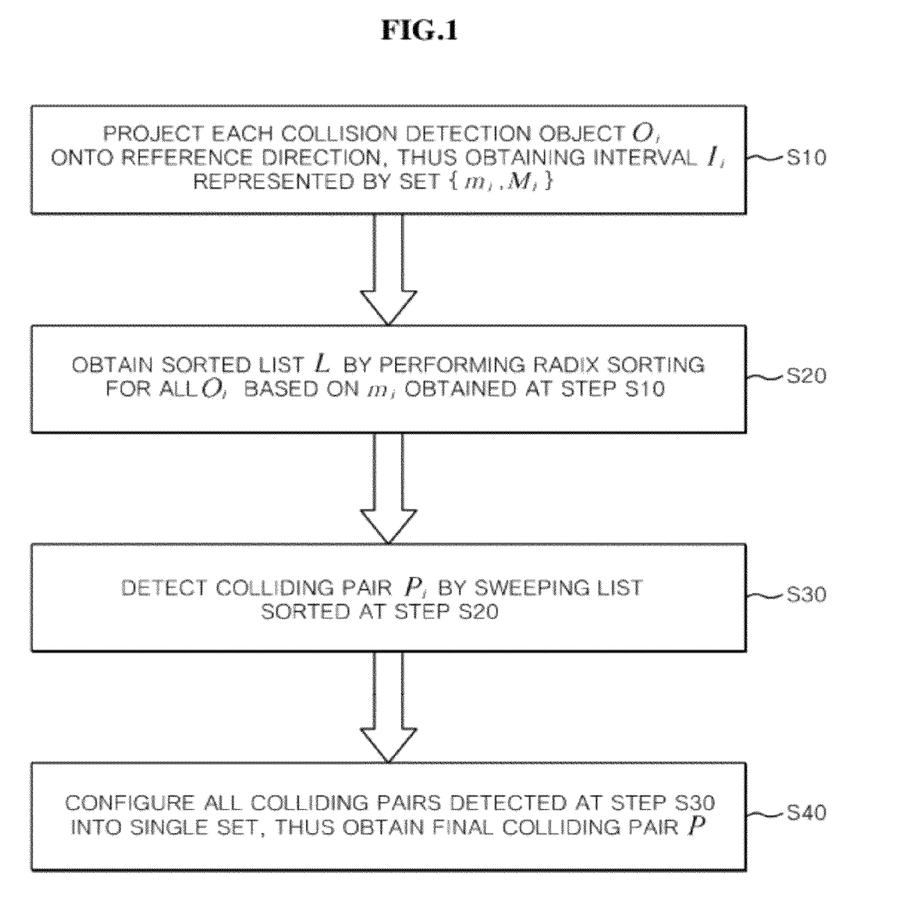
FIG. 1 is a flowchart showing an embodiment of a parallel SaP algorithm according to the present invention.

FIG. 1 is a flowchart showing an example of a parallel SaP algorithm according to the present invention. The parallel SaP algorithm according to the present invention includes the following steps.

Step S10: Each collision detection object $O_i$ is projected onto one direction axis, thus obtaining the interval $I_i$. The reference direction of step S10 is one of x, y and z axis directions.

Step S20: A sorted list L is calculated for all $O_i$ based on $m_i$ using radix sorting.

Step S30: For each $O_i$, the following sub-steps are performed in parallel, and include (a) the step S30-1 of sweeping the sorted list L within the interval $I_i$ until $M_i < m_j$ is satisfied for collision detection objects $O_j$ corresponding to i<j, and (b) the step S30-2 of adding the pair $(O_i, O_j)$ to $P_i$ if $O_i \cap O_j \neq 0$ in the case where $m_j \in I_i$ is satisfied for a certain a $O_j$.

Step S40: $P \equiv \cup P_i$, that is, the union of all sets $P_i$ obtained at step S30 is obtained, and thus the final collision pair P is obtained.

One GPU thread is allocated to each collision detection object $O_i$, and then a subset of the sorted list L is swept to obtain a local list for colliding pairs $P_i = \{(O_i, O_j) | i<j, m_j \in I_i\}$ (where conditions of $\exists j>i$ and $M_i \geq m_j$ are satisfied).

Figure 2:
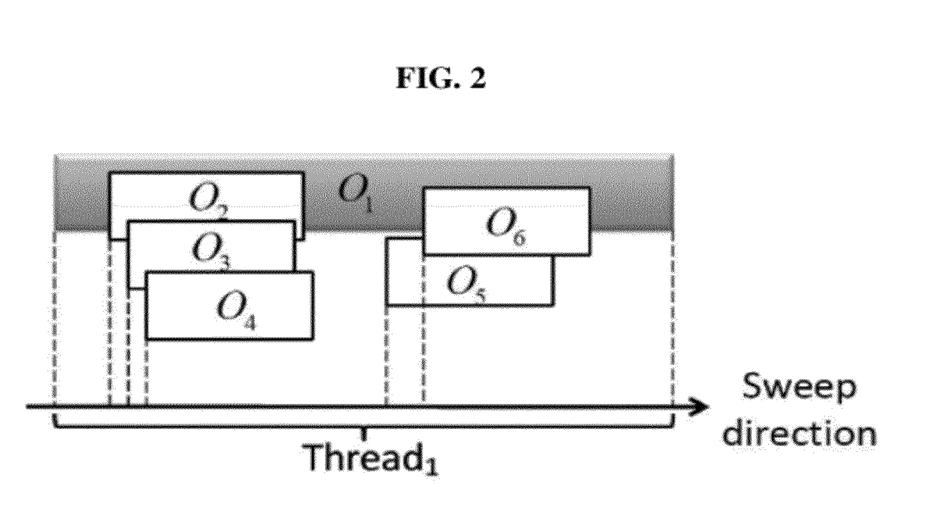
FIG. 2 is a diagram showing collision pairs on which the occurrence of a collision is tested using the parallel SaP algorithm according to the present invention.

FIG. 2 is a diagram showing a colliding pair on which the occurrence of a collision is tested using the parallel SaP algorithm according to the present invention. $O_1$ is handled by a thread$_1$, and colliding pairs are $\{(O_1, O_2), (O_1, O_3), (O_1, O_4), (O_1, O_5), (O_1, O_6)\}$. Whether collision has actually occurred on the colliding pairs is tested.

The present invention executes the algorithm by merging the conventional third and fourth steps so as to improve the arithmetic intensity of the parallel SaP algorithm. Here, the term "arithmetic intensity" denotes the ratio of the numbers of mathematical computations performed per word that is transmitted to memory. The merging of the conventional third and fourth steps is achieved by performing an overlap test on each colliding pair $(O_i, O_j) \in P_i$ satisfying $O_i \cap O_j \neq 0$ in the space of all dimensions.

When a collision detection object has the shape of a sphere rather than the shape of an AABB, the merging of the conventional third and fourth steps is further simplified. When the distance of centers of two spheres are compared to the sum of the radii of the two spheres, the merging is possible.

Finally, when all threads have completed their tasks, the union of local colliding pairs is calculated, and thus the final list P is obtained. When the recently developed GPU is used, several tens of thousands of threads are processed in parallel.

Furthermore, since the parallel SaP algorithm of the present invention does not require a preprocessing step nor an additional querying structure, collision detection objects can be utilized in such a way that they are easily added or removed.

Thread Allocation

The parallel SaP algorithm according to the present invention can be processed on a GPU using a very large number of computational threads. However, when collision detection objects have different sizes, larger collision detection objects may include more colliding pairs than smaller objects. In this case, one thread allocated to this larger collision detection object performs more tasks than a thread allocated to a smaller collision detection object, and the thread allocated to the smaller collision detection object falls into an idle state without having any task to perform. Consequently, this results in not only imbalance in the distribution of tasks, but also power consumption for GPU operations.

Such a problem can be solved by allocating more threads to collision detection objects for which the testing of more colliding pairs is to be carried out. Since the precise number of colliding pairs cannot be known before a collision test is carried out, it can be assumed that the number of times the testing of colliding pairs is carried out will increase in proportion to the size of the collision detection objects.

Figure 3:
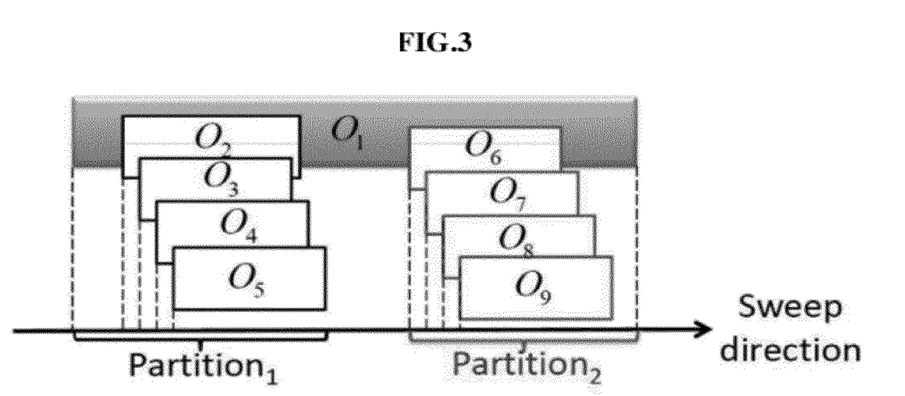
FIG. 3 is a diagram showing an example of a procedure for distributing unbalanced collision pair tests on the basis of partitions.

In the present invention, colliding pair tests for collision detection objects are divided into partitions, each having the same number of tests, and then one thread is allocated to each partition. FIG. 3 is a diagram showing an example of a procedure for distributing imbalanced colliding pair tests based on the partitions. Referring to FIG. 3, $O_1$ must perform a collision test with eight collision detection objects, and $O_4$ must perform one collision test with $O_5$. However, when $O_1$ is divided into two partitions, each thread needs only to perform four collision tests.

In detail, it is assumed that a collision detection object $O_i$ has a set of pairs for collision test $S_\iota = \{(O_\iota, On_1), \ldots, (O_\iota, On_\varphi)\}$. This set is divided into subsets $S_i = Pi_1 \cup Pi_2 \cup \ldots \cup Pi_K$, wherein $Pi_K = \{(Oi, On_{\ni 1}), \ldots, (O_1, On_{\ni \lambda})\}$, and $|S_\iota| = \Sigma |Pi_k|$. Furthermore, a restriction of $|Pi_k| = \tau$ is additionally given, where $\tau$ is the maximum number of colliding pairs that can be allocated to one thread.

The present invention allocates one thread $T_\iota$ for performing a collision test in each partition Pi. Actually, $\tau$ can be set to the maximum number of active threads that can be operated in the GPU. As the number of active threads increases, $\tau$ decreases.

Since a currently developed GPU device cannot dynamically allocate a thread, the number of GPU threads required must be determined in advance. The number of partitions for the collision detection object $O_i$ is first calculated using binary search for detecting the location of $M_t$ satisfying $m_\pi \le M_t \le m_{\pi+1}$ from L. The number of partitions for $O_i$ is given by the value of $$\left\lceil \frac{p-i}{\tau} \right\rceil,$$

where p−i denotes the number of potential colliding pairs. Finally, the total number of partitions for all collision detection objects is the total number of GPU threads required for allocation.

Determination of Sweep Direction

Figure 4:
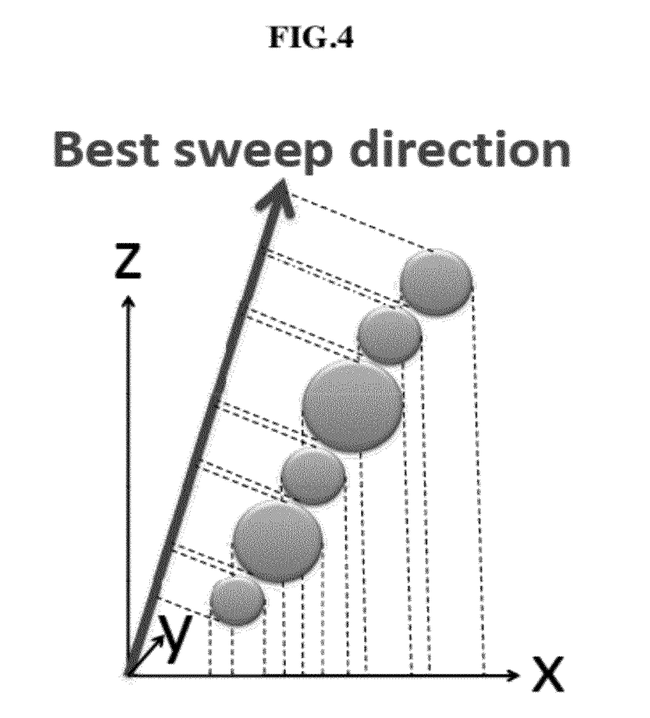
FIG. 4 is a diagram illustrating a best sweep direction.

The above algorithm assumes that the sweep direction is a direction corresponding to one of three axes. This assumption may result in inefficiency in the SaP algorithm. For example, in the example of FIG. 4, when an x axis direction is selected as a sweep direction, an excessively large number of collision tests are performed.

A best sweep direction is one direction which allows projection to separate data as much as possible. Principal Component Analysis (PCA) can be used to find a sweep direction which maximizes variations in the collision detection objects after the collision detection objects have been projected.

Principal component analysis is intended to linearly convert data into data of a new coordinate system so that axes are sequentially placed in such a way that when data is mapped to one axis, the axis on which the variance thereof is largest is selected as a first coordinate axis, and an axis on which the variance is next largest is selected as a second coordinate axis. Various applications are possible by placing "the most principal" component of data on each axis. The principal component is described as an eigenvector, but does not have a predefined eigenvector unlike other linear conversion techniques, and such an eigenvector varies with the characteristics of the data.

A sweep direction is identical to the direction of the first principal component in the determination of the sweep direction using PCA. The direction $w_1$ of the first principal component of a data set X is defined by the following Equation 1. In this case, in order to minimize the Mean Square Error (MSE) of data, mean subtraction is performed using a mean of zero.

$$w_1 = \underset{\|w\|=1}{\operatorname{argmax}} \operatorname{Var}\{w^T X\} \qquad (1)$$
$$= \underset{\|w\|=1}{\operatorname{argmax}} E\{w^T X X^T w\}$$

where $w_1$ denotes an eigenvector corresponding to the largest eigenvalue of covariance matrix $C=XX^T$.

Although PCA has been implemented using the GPU, this algorithm is disadvantageous in that the speed thereof is very slow in interactive application programs. In order to solve this problem, the present invention calculates the mean value of X using (a) a reduced parallel scan algorithm. Through this procedure, the computation of the eigenvector $C=XX^T$ is simplified. X has a size of 3×n, and C is a 3×3 symmetric matrix. (b) Finally, the Jacobi method is used to calculate the eigenvalue of the symmetric matrix C. Through this procedure, the determination of the sweep direction can be performed faster even in an interactive program.

Motion Coherence

The conventional third step of the conventional SaP algorithm can be replaced using a swapping operation, as described above.

The swapping operation of the conventional SaP algorithm uses motion coherence. In particular, this is very effective when a small number of collision detection objects are moving. However, the procedure such as the conventional swapping in the algorithm of the present invention is not suitable because memory access that consumes more costs than those of computations performed on the GPU is required.

Figure 5:
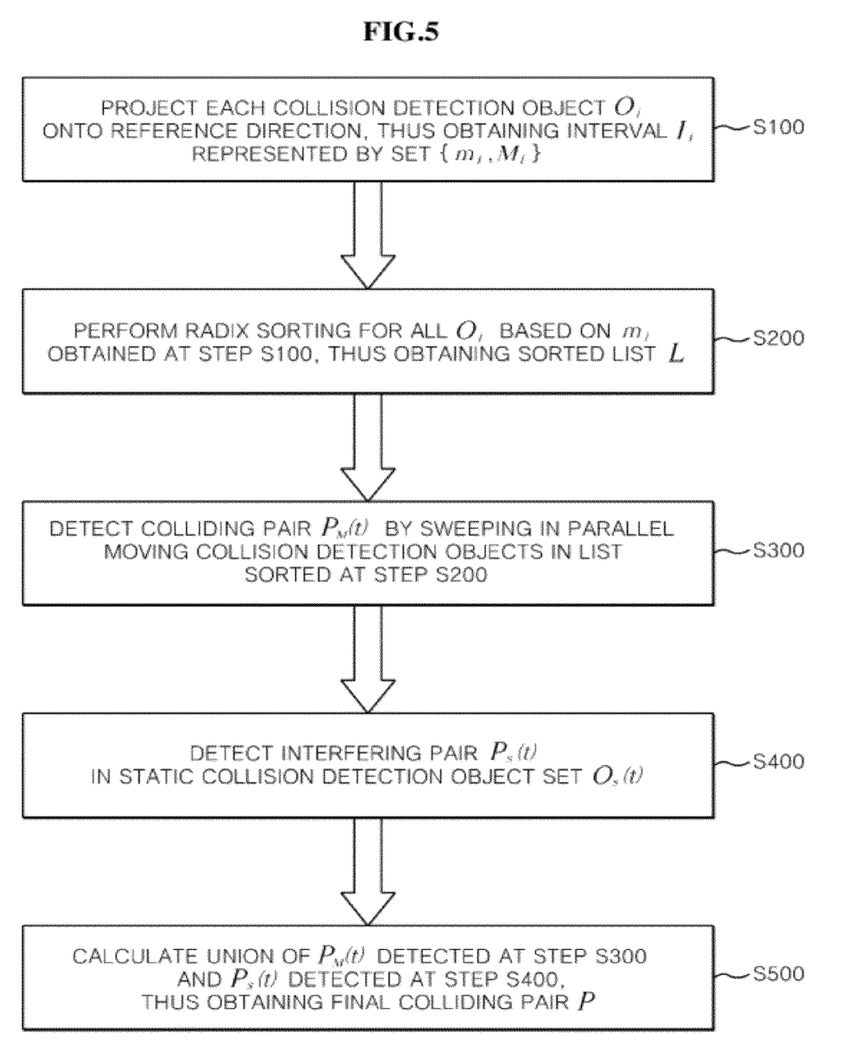
FIG. 5 is a diagram showing another collision detection method including the step described in motion coherence.

Therefore, the present invention is intended to propose a GPU-customized technology that is executable instead of the conventional third step. That is, when motion coherence is used, another collision detection method differing from that of the above-described steps S10 to S40 is derived. FIG. 5 is a flowchart showing another collision detection method including the step described in the motion coherence.

The motion coherence is utilized by classifying a collision detection object set $O=\{O_t\}$ at time t into two time-dependent subsets which are mutual difference sets. The two subsets correspond to a set $O_\mu(t)$ for moving collision detection objects and a set $O_o(t)$ for static collision detection objects. Therefore, $O=O_\mu(t) \cap O_o(t)$ is obtained.

The present invention detects a time-dependent colliding pair P(t) by individually performing collision detection on $O_\mu(t)$ and $O_o(t)$. This method is effective when $|O_\mu(t)| \, |O_o(t)|$ because the collision pair of $O_o(t)$ is not greatly different from the colliding pair of $O_o(t-1)$. Therefore, a small update is required in variations from P(t−1) to P(t).

In detail, the update from the colliding pair P(t−1) to P(t) is performed by the following steps:

Step S100: Each collision detection object $O_i$ is projected in the reference direction, so that an interval $I_i$ represented by a set $\{m_i, M_i\}$ is obtained.

Step S200: Radix sorting is performed based on $m_i$ calculated at step S100 for all $O_i$, and thus a sorted list L is obtained.

Step S300: The colliding pair $P_M(t)$ occurring due to the moving collision detection object is calculated from $O_\mu(t)$ by the following sub-steps:

(a) For all $O_i$ belonging to $O_o(t)$, a set $P_{o\mu}(t)$ of colliding pairs between the sets of static collision detection objects $O_o(t)$ and the sets of moving collision detection objects $O_\mu(t)$ is detected using parallel sweeping. That is, $P_{o\mu}(t)=\{(O_i, O_j)|O_i \cap O_j \neq 0 \vee O_i \in O_o(t), O_j \in O_\mu(t) \vee i<j\}$ is obtained.

(b) For all $O_t$ belonging to $O_\mu(t)$, the set $O_\mu(t)$ of moving collision detection objects is compared to the sets O of all of other collision detection objects using parallel sweeping, and thus the set $P_{\mu*}(t)$ of colliding pairs is detected. That is, $P_{\mu*}(t)=\{(O_i, O_j)|O_i \cap O_j \neq 0 \vee O_i \in O_\mu(t), O_j \in O \vee i<j\}$ is obtained.

(c) $P_M(t)=P_{o\mu}(t) \cap P_{\mu*}(t)$ is calculated.

Step S400: Interfering pair $P_o(t)$ is detected from the set $O_o(t)$ of static collision detection objects after the colliding pair P(t−1) corresponding to the previous time is detected. This procedure is represented by $P_o(t)=P(t-1)-P'_M(t-1)$. Here, even in the case of $O_\mu(t)$ in which one collision detection object is present at time t in each pair, $P'_M(t-1)$ is the set $P'_M(t-1)$ of colliding pairs at time t−1. That is, $P'_M(t-1) \equiv \{\forall (O_i, O_j) \in P(t-1)|O_i \in O_\mu(t) \vee O_j \in O_\mu(t)\}$ is obtained.

Step S500: Finally, a colliding pair P(t) satisfying $P(t)=P_M(t) \cap P_o(t)$ is obtained.

When the SaP algorithm is applied to a very large number of collision detection objects, overlapping may frequently occur between projected intervals in the sweep direction. This problem may also occur when the optimal sweep direction is determined using the above-described PCA technology. In order to solve this problem, the present invention is intended to propose a hybrid SaP technique in which workspace subdivision and cell subdivision are combined with each other.

Workspace Subdivision

In order to reduce the density of the intervals of collision detection objects projected onto a sweep axis, workspace subdivision which is first subdivision is performed before a SaP algorithm is executed. This subdivision is uniform subdivision for allowing the algorithm to be efficiently executed on each GPU.

FIG. 6A is a graph showing 2×2 workspace subdivision and FIG. 6B is a graph showing an example of a procedure for shifting cells to execute the SaP algorithm.

When a sweep direction for the SaP algorithm is assumed to be d, a 3D workspace can be subdivided into m×m grid cells cut by a plane parallel to d. FIG. 6A corresponds to the cross-section of the z axis of 2×2 subdivision when x is a sweep direction. All initial collision detection objects are arranged in two subsets. The two subsets are $O_{i,v}=\{O_i \in O | O_i$ is completely present in certain cell $C_\phi\}$ and $O_{b\delta}=O-O_{i,v}$, respectively. Subsequently, $O_{b\delta}$ is extended.

Actually, a value of m has been experimentally determined and used by $$m = \lceil \frac{n}{64K} \rceil,$$

where n is the number of collision detection objects.

When there is no collision detection object $O_{b\delta}$ passing through the boundary of a certain cell (that is, $O_{b\delta}=0$), the SaP algorithm according to the present invention can be executed on parallel lines passing through the rows or columns of grid cells. For this, as shown in FIG. 6A, an index that can be identified by each cell (indicated by $C_1$ and $C_2$ in FIG. 6A). Referring to FIG. 6A, it can be seen that $\{O_1, O_3, O_4\} \subset C_1$, $\{O_2, O_3, O_5, O_6\} \subset C_2$, $\{O_2, O_3, O_5\} \subset Cr_1$, $\{O_1, O_2, O_4, O_5, O_6\} \subset O_{i,v}$, and $\{O_2, O_3, O_5\} \subset O_{b\delta}$ are satisfied.

Thereafter, the interval $I_i$ projected by each collision detection object satisfying $O_i \in O_{in}$ can be changed using $(j-1) \times l$ along the direction of d. As shown in FIG. 6B, a cell to which the $O_i$ belongs is $C_\phi$, and l denotes the size of a workspace along the direction d. This change is called a shifting technique. This shifting technique allows the number of overlaps of collision detection objects in the sweep direction to be reduced, and improves the effects of the SaP algorithm. Referring to FIG. 6B, $\{O_1, O_4\}$ and $\{O_2, O_5, O_6\}$ are shifted with $C_1$ and $C_2$, respectively, because $\{O_1, O_4\}=C_1 \cap C_{i,v}$ and $\{O_2, O_5, O_6\}=C_2 \cap O_{i,v}$ are satisfied. Since $\{O_{2'}, O_3, O_5\}=Cr_1 \cap O_{b\delta}$ is satisfied, $\{O_{2'}, O_3, O_5\}$ is shifted with $Cr_1$.

Actually, a certain collision detection object may pass through cell boundaries ($O_{b\delta} \neq 0$). A collision detection object potentially having a possibility to collide with a collision detection object present in $O_{b\delta}$ can be detected. It can be considered that such a collision detection object is influenced by boundaries.

In order to detect such a collision detection object, the maximum size of a collision detection object present in $O_{b\delta}$ must be calculated. For example, the maximum size of a sphere is the diameter of the sphere, and the maximum size of the AABB is the longest 3D length of the AABB.

After the maximum size of the collision detection object present in $O_{b\delta}$ has been calculated, the region $R=\{C_{P1}, \ldots, C_{Pv}\}$ influenced by $O_{b\delta}$ can be estimated. For example, in FIG. 6, $R=C_{\rho 1}$. Further, all collision detection objects overlapping with R can be detected. The collision detection objects overlapping with R are added to $O_{b\delta}$. A new cell index is assigned to each $C_{\rho i}$, and $C_{\rho i}$ is handled as a new cell. Each collision detection object present in $O_{b\delta}$ is associated with the cell $C_{\rho i}$ overlapping with each collision detection object. For example, referring to FIG. 6, initial $O_{b\delta}=\{O_3\}$, but it is expanded to $\{O_2, O_3, O_5\}$ due to $C_{\rho i}$.

Figure 6:
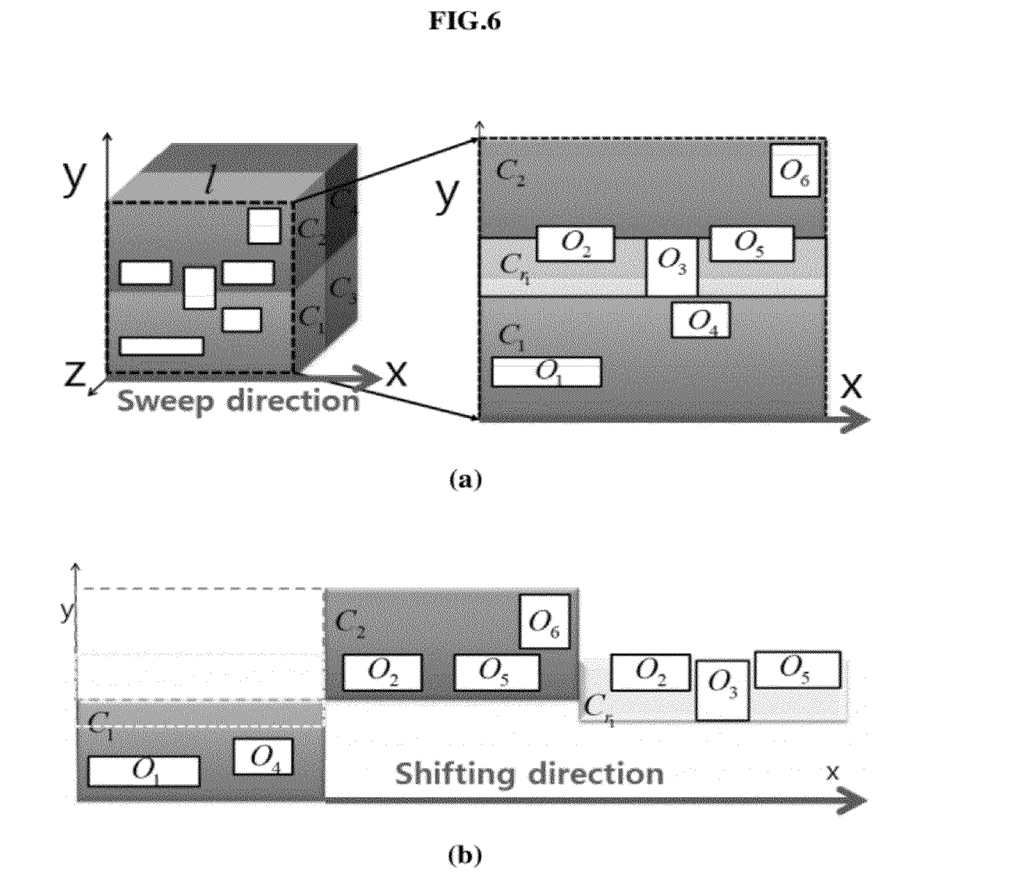
FIG. 6A is a graph showing 2×2 workspace subdivision.
FIG. 6B is a graph showing an example of a procedure of shifting cells to perform SaP.

A certain collision detection object may simultaneously belong to $C_{i,v}$ and $O_{b\delta}$, as in the case of $O_2$ and $O_5$ of FIG. 6, and may then be influenced by one or more cells that are in R.

Cell Subdivision

Since collision detection objects belonging to different cells in workspace subdivision cannot collide with each other, there is no need to perform a collision test on collision detection objects belonging to different cells. Therefore, computational overhead on a parallel SaP can be greatly reduced. However, in a certain cell, associated collision detection objects do not actually intersect, but a large number of collision detection objects having an overlapping projection interval may be included in the cell. In order to reduce such a false positive, it is preferable to perform intra-cell subdivision which is a second subdivision during the operation of SaP.

Figure 7:
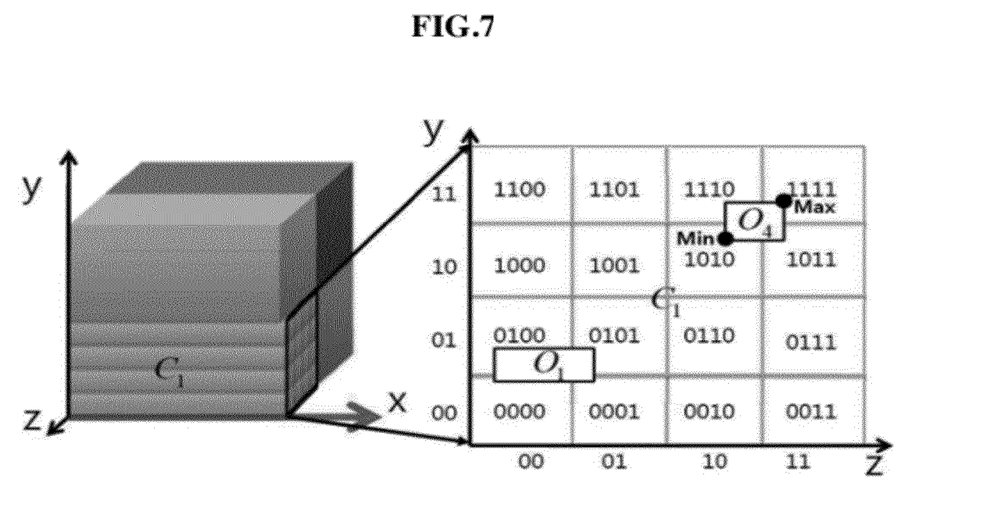
FIG. 7 is a graph showing an example of cell subdivision according to the present invention.

FIG. 7 is a graph showing an example of cell subdivision according to the present invention. In the drawing, each cell is divided into 4×4 subcells, and the right side of the drawing shows an enlarged sectional view of region $C_1$.

Since the cell subdivision of the present invention is intended to divide the cells of workspace subdivision parallel to a sweep direction, it corresponds to 2D subdivision. Hereinafter, a new mapping method for subcells is intended to be introduced. An m-bit address is used, where m is the logarithm of the total number of subcells, and half of these bits correspond to each dimension, as shown in FIG. 7.

Such cell subdivision allows SaP to be performed only on collision detection objects which share the same subcell. FIG. 7 illustrates an example in which one cell is divided into 16 subcells, and shows that a collision test between collision detection objects present in $O_1$ and $O_4$ is not performed. Which collision detection object is included in a certain subcell can be detected.

The number of subcells is preferably divided into a number of devices that can be sufficiently performed by the GPU device.

In FIG. 7, the extremal points of $O_4$ are mapped to 1010 and 1111. Whether they share the same subcell can be determined by performing an AND operation on respective corresponding bits. Finally, SaP performed in parallel with respect to each $O_i$ needs to be performed only on collision detection objects having the same subcell. Through this operation, candidate sets can be greatly reduced, and then the efficiency of the algorithm is increased.

Experiments for Proving Effects and Experimental Data

Hereinafter, experimental results for proving the effects of the broad-phase collision detection algorithm according to the above-described present invention will be described.

In the present experiments, programming languages such as Visual Studio C++ and NVIDIA CUDA were used, and the computer used for the experiments was a computer which has the specification of an Intel Quad-core 2.66 GHz CPU and of 2.8 GB main memory and in which an NVDIA Tesla C1060 graphic card having 4 GB memory is installed.

Initial collision detection objects and final collision results were stored in the global memory of the GPU. The experiments were conducted using collision detection objects having various shapes. The method of the present invention and other algorithms based on the CPU or the GPU were compared in performance in relation to random configuration, particle simulation, and rigid-body dynamics.

Figure 8:
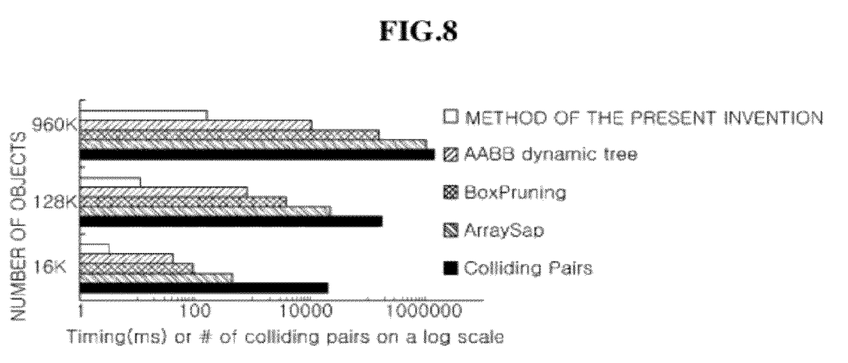
FIG. 8 is a bar graph showing the comparison of the detection performance of the method of the present invention with other collision detection algorithms.

Among the experiments, an experiment conducted on random configuration will be representatively described. As an object for benchmarking, an object similar to a bullet collision library was used. Objects in which AABBs are arranged in a non-uniform manner and are moved randomly were used. The number of AABBs was set to three types, that is, 16K, 128K and 960K. The method of the present invention was compared to methods of BoxPruning, ArraySap and AABB dynamic tree. As shown in FIG. 8, the method of the present invention exhibited a much faster speed compared to other conventional methods.

Further, when some collision detection objects were moved, the performance results of the method according to the present invention were tested. Objects were one million AABBs having different sizes, and were designated to vary from 5% to 25% in the entire range.

Figure 9:
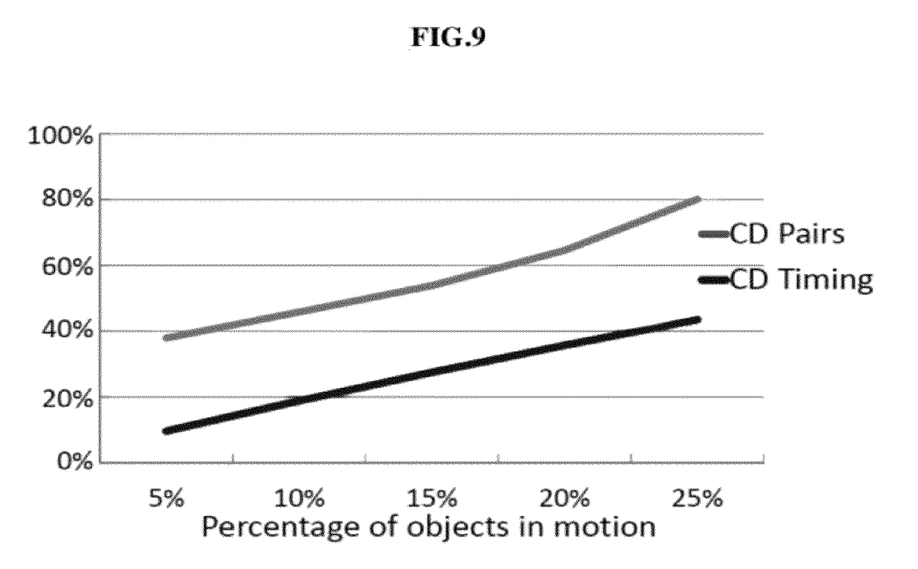
FIG. 9 is a diagram showing the results of collision detection according to the method of the present invention when a part of collision detection objects are moving.

FIG. 9 is a diagram showing the results of collision detection according to the method of the present invention when a part of collision detection objects are moving. The term 'CD Pairs' denotes the proportion of collisions that occurred due to moving objects, and the term 'CD Timing' denotes the computation time relative to all moving objects.

As shown in FIG. 9, it can be seen that a new collision occurs due to moving objects, but computation time for this has increased only linearly. These results mean that the method of the present invention efficiently utilizes collision results caused by static objects.

Figure 10:
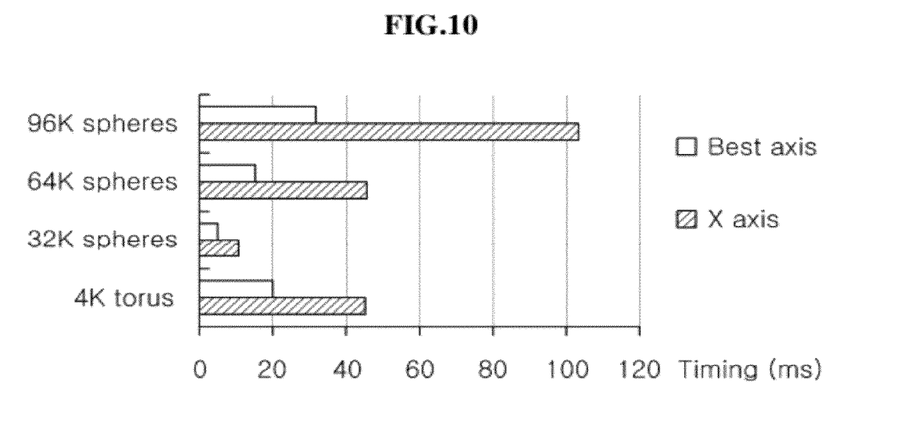
FIG. 10 is a bar graph showing the comparison of the results of the performance of the case using a best sweep direction according to the present invention with the case in which an X axis is equally set to a sweep direction.

FIG. 10 is a bar graph showing the comparison of the results of the performance of the case using a best sweep direction (Best axis) according to the present invention with the case in which an X axis is equally set to the sweep direction. Experiments were conducted on spheres moving in an AABB, and it can be seen that the method using the PCA according to the present invention is more than three times faster than the conventional method.

Figure 11:
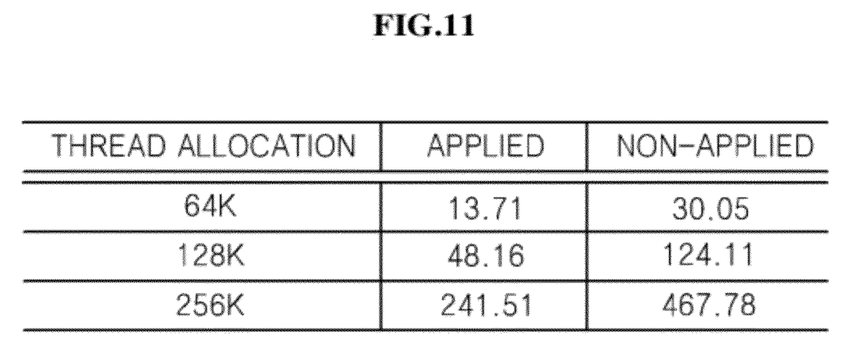
FIG. 11 is a diagram showing the comparison of the timings of a collision detection algorithm between the case where thread allocation is applied and the case where thread allocation is not applied according to the present invention.

FIG. 11 is a diagram showing the comparison of the timings of a collision detection algorithm between the case where thread allocation is applied and the case where thread allocation is not applied according to the present invention. The unit of time is ms (milliseconds), and each of 64K, 128K, and 256K on the left side of the drawing denotes the number of objects. It can be seen that the algorithm based on thread allocation exhibits performance that is more than twice as high as that of the algorithm that is not based on thread allocation.

The present embodiments and attached drawings of the present specification are intended only to clearly indicate a part of the technical spirit of the present invention and it is apparent that modifications and detailed embodiments that can be easily deduced by those skilled in the art within the scope of the technical spirit included in the specification and drawings of the present invention will be included in the scope of the present invention.

As described above, the method of detecting collisions in a GPU according to the present invention has the following advantages.

First, the present invention can perform SaP in parallel on a plurality of collision detection objects using blocks of a plurality of threads on a GPU.

Second, the present invention determines a best sweep direction using Principal Component Analysis (PCA), thus improving the efficiency of a SaP algorithm.

Third, the present invention merges two-step spatial subdivision with the parallel SaP, thus mitigating the problems related to dense projection intervals that may occur in spatial removal.

Fourth, in a simulation environment, the present invention may add or remove objects which are colliding detection objects, thus enabling collision detection suitable for a specific purpose to be performed.

The advantages of the present invention are not limited to those descriptions, and other advantages, not described here, should be clearly understood by those skilled in the art from the description.

What is claimed is:

1. A method of detecting collisions on a Graphics Processing Unit (GPU), the method comprising:
  a) projecting respectively each of collision detection objects $O_i$ onto a reference direction so as to obtain a respective interval $I_i$ represented by a set $\{m_i, M_i\}$;
  b) performing radix sorting based on $m_i$ for all $O_i$ so as to obtain a sorted list L;
  c) performing, in parallel, for each $O_i$:
    sweeping the sorted list L within the interval $I_i$ for each of collision detection objects $O_j$ where i<j until $M_i < m_j$; and
    adding a colliding pair $(O_i, O_j)$ to colliding pairs $P_i$ if $O_i \cap O_j \neq 0$ where $m_j \in I_i$ for $O_j$; and
  d) joining all of the colliding pairs $P_i$ into a final colliding pair P,
  wherein an i-th collision detection object of n collision detection objects is denoted by $O_i$, and $m_i$ and $M_i$ respectively denote locations of extremal points in the reference direction.

2. The method according to claim 1, wherein one GPU thread is allocated to each $O_i$ so that collision detection is performed.

3. The method according to claim 1, wherein each $O_i$ is divided into partitions, each having an identical number of collision detections, and a single GPU thread is allocated to each partition, thus performing collision detection.

4. The method according to claim 3, wherein binary search is performed on the sorted list L to determine a number of partitions, which is represented by $$\left\lceil \frac{p-i}{\tau} \right\rceil,$$

where p−i denotes a number of potential colliding pairs, and $\tau$ denotes a maximum number of colliding pairs to which a single thread can be allocated.

5. The method according to claim 1, wherein a sweep direction at c) is determined using Principal Component Analysis (PCA), and the sweep direction is determined by a vector value $w_1$ given in the following equation, the vector value $w_1$ being identical to a direction of a first principal component of PCA, $$w_1 = \underset{\|w\|=1}{\mathrm{argmax}} \mathrm{Var}\{w^T X\}$$
$$= \underset{\|w\|=1}{\mathrm{argmax}} E\{w^T X X^T w\}$$

where $w_1$ denotes an eigenvector corresponding to a largest eigenvalue of a covariance matrix $C = XX^T$.

6. The method according to claim 1, further comprising a0) dividing a workspace, before a).

7. The method according to claim 6, wherein a0) comprises:
- a0-1) when a sweep direction is assumed to be 'd' at c), subdividing the workspace into m×m grid cells cut by a plane parallel to 'd'; and
- a0-2) when there is a collision detection object passing through boundaries of cells subdivided at a0-1), shifting the interval $I_i$ using (j−1)×l which is the direction 'd', wherein $$m = \lceil \frac{n}{64K} \rceil,$$

n is a number of collision detection objects, j is an index of a cell $C_\phi$ to which $O_\iota$ belongs, and l is a size of the workspace along the direction 'd'.

8. The method according to claim 1, further comprising, before c), performing cell subdivision to remove collision detection objects which do not actually intersect, but have overlapping projection intervals.

9. The method according to claim 8, wherein the performing cell subdivision is configured to divide a single cell into a reference number of subcells and to eliminate a relevant collision detection object from collision detection objects when the relevant collision detection object is not a collision detection object that shares an identical subcell.

10. A method of detecting collisions in a Graphics Processing Unit (GPU), the method comprising:
- a) projecting respectively each of collision detection objects $O_i$ onto a reference direction so as to obtain a respective interval $I_i$ represented by a set $\{m_i, M_i\}$;
- b) performing radix sorting based on $m_i$ for all $O_i$ so as to obtain a sorted list L;
- c) performing in parallel:
  - detecting a set $P_{o\mu}(t)$ of colliding pairs between a set $O_o(t)$ of static collision detection objects and a set $O_\mu(t)$ of moving collision detection objects for each $O_i$ belonging to the set $O_o(t)$ of static collision detection objects, by using parallel sweeping;
  - detecting a set $P_{\mu*}(t)$ of colliding pairs by comparing the set $O_\mu(t)$ of the moving collision detection objects with sets O of all other collision detection objects, for each $O_i$ belonging to the set $O_\mu(t)$ of the moving collision detection objects by using parallel sweeping; and
  - calculating a union $P_M(t)$ of the set $P_{o\mu}(t)$ and the set $P_{\mu*}(t)$
- d) detecting interfering pairs $P_o(t)$ from the set $O_o(t)$ of the static collision detection objects; and
- e) calculating a union of the set $P_M(t)$ and the interfering pairs $P_o(t)$ so as to obtain a final colliding pair P, wherein an i-th collision detection object of n collision detection objects is denoted by $O_i$, and $m_i$ and $M_i$ respectively denote locations of extremal points in the reference direction.

11. The method according to claim 10, wherein d) is configured to detect the interfering pairs $P_o(t)$ from the set $O_o(t)$ of the static collision detection objects after a colliding pair P(t−1) corresponding to previous time, wherein $P_o(t)$ is detected by calculating a difference set between P(t−1) and $P'_M(t-1)$ represented by the following equation:

$$P'_M(t-1) \equiv \{\forall (O_i, O_j) \in P(t-1) | O_i \in O_\mu(t) \vee O_j \in O_\mu(t)\}.$$

12. The method according to claim 10, further comprising a0) dividing a workspace, before a).

13. The method according to claim 12, wherein a0) comprises:
- a0-1) when a sweep direction is assumed to be 'd' at c), subdividing the workspace into m×m grid cells cut by a plane parallel to 'd'; and
- a0-2) when there is a collision detection object passing through boundaries of cells subdivided at a0-1), shifting the interval $I_i$ using (j−1)×l which is the direction 'd', wherein $$m = \lceil \frac{n}{64K} \rceil,$$

n is a number of collision detection objects, j is an index of a cell $C_\phi$ to which $O_\iota$ belongs, and l is a size of the workspace along the direction 'd'.

14. The method according to claim 10, wherein:
- a sweep direction at c) is determined using Principal Component Analysis (PCA), and the sweep direction is determined by a vector value $w_1$ given in the following equation, the vector value $w_1$ being identical to a direction of a first principal component of PCA, $$w_1 = \underset{\|w\|=1}{\mathrm{argmax}} \mathrm{Var}\{w^T X\}$$
$$= \underset{\|w\|=1}{\mathrm{argmax}} E\{w^T X X^T w\}$$

where $w_1$ denotes an eigenvector corresponding to a largest eigenvalue of a covariance matrix $C = XX^T$.

15. The method according to claim 10, further comprising, before c), performing cell subdivision to remove collision detection objects which do not actually intersect, but have overlapping projection intervals.

16. The method according to claim 15, wherein the performing cell subdivision is configured to divide a single cell into a reference number of subcells and to eliminate a relevant collision detection object from collision detection objects when the relevant collision detection object is not a collision detection object that shares an identical subcell.

* * * * *